US008699056B2

(12) United States Patent
Shudo

(10) Patent No.: US 8,699,056 B2
(45) Date of Patent: Apr. 15, 2014

(54) PRINTING SYSTEM, PRINTING APPARATUS, TERMINAL APPARATUS, PRINT SETTING METHOD AND PRINT SETTING PROGRAM

(75) Inventor: Takao Shudo, Kobe (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1234 days.

(21) Appl. No.: 11/976,710

(22) Filed: Oct. 26, 2007

(65) Prior Publication Data
US 2008/0130047 A1 Jun. 5, 2008

(30) Foreign Application Priority Data

Dec. 1, 2006 (JP) ................. 2006-326271

(51) Int. Cl.
G06F 3/12 (2006.01)
G06K 15/00 (2006.01)
(52) U.S. Cl.
USPC .................. 358/1.15; 358/1.13; 358/1.16
(58) Field of Classification Search
USPC ....................................................... 358/1.15
See application file for complete search history.

(56) References Cited

U.S. PATENT DOCUMENTS

| 6,922,723 B1* | 7/2005 | Sharp et al. ................ 709/221 |
| 7,206,091 B2 | 4/2007 | Hagiuda |
| 7,256,900 B1 | 8/2007 | Hanaoka |
| 2003/0160989 A1* | 8/2003 | Chapin et al. ............... 358/1.13 |
| 2003/0231329 A1* | 12/2003 | Edmonds et al. ............ 358/1.13 |
| 2004/0004734 A1* | 1/2004 | Brown et al. ................ 358/1.14 |
| 2004/0203358 A1* | 10/2004 | Anderson et al. ............ 455/41.1 |
| 2005/0105130 A1* | 5/2005 | Hagiuda ...................... 358/1.15 |
| 2005/0191077 A1* | 9/2005 | Nishizawa et al. ............. 399/80 |
| 2005/0221844 A1* | 10/2005 | Trethewey et al. ......... 455/456.6 |
| 2006/0195495 A1* | 8/2006 | Asano ........................... 708/111 |
| 2006/0203282 A1* | 9/2006 | Iwai ............................ 358/1.15 |
| 2006/0221385 A1* | 10/2006 | Ohara et al. ................. 358/1.15 |
| 2007/0079013 A1* | 4/2007 | Dayakar et al. .............. 709/250 |
| 2012/0290694 A9* | 11/2012 | Marl et al. ................... 709/223 |

FOREIGN PATENT DOCUMENTS

| JP | 3184687 B2 | 6/1995 |
| JP | 2001-142665 | 5/2001 |
| JP | 2005-085132 | 3/2005 |
| JP | 2005-149094 | 6/2005 |
| JP | 2006-043931 | 2/2006 |

* cited by examiner

Primary Examiner — King Poon
Assistant Examiner — Vincent Peren
(74) Attorney, Agent, or Firm — Buchanan Ingersoll & Rooney PC

(57) ABSTRACT a printing system comprising a terminal apparatus and a printing apparatus interconnected via a network, and said printing apparatus comprising: an identifier that identifies a user making access; an information acquirer that acquires information of a terminal apparatus used by the user who is identified by said identifier; and a transmitter that transmits printing apparatus information that is information of the printing apparatus itself, to the user's using terminal apparatus that is indicated in the information acquired by said information acquirer, and said terminal apparatus comprising: a receiver that receives the printing apparatus information transmitted from said printing apparatus; and a setter that sets said printing apparatus as the default printing apparatus according to the printing apparatus information received by said receiver.

12 Claims, 8 Drawing Sheets

| | 46 | | | 47 | |
|---|---|---|---|---|---|
| IP Address | Subnet Mask | DHCP | Name of the Default Printer | IP Address of the Default Printer |
| 192.168.0.10 | 255.255.255.0 | NO | Image Forming Apparatus1 | 192.168.0.86 |

| No. | IP Address | Subnet Mask | DHCP | Name of the Default Printer | IP Address of the Default Printer |
|---|---|---|---|---|---|
| 1 | 192.168.0.21 | 255.255.255.0 | NO | Printer 1 | 192.168.0.92 |
| 2 | 192.168.0.18 | 255.255.255.0 | NO | Printer 2 | 192.168.0.54 |
| 3 | 192.168.1.32 | 255.255.255.0 | YES | Printer 3 | 192.168.1.87 |
| 4 | 172.16.0.8 | 255.255.0.0 | NO | Printer 4 | 172.16.0.25 |
| ... | ... | ... | ... | ... | ... |

PRINTING SYSTEM, PRINTING APPARATUS, TERMINAL APPARATUS, PRINT SETTING METHOD AND PRINT SETTING PROGRAM

This application claims priority under 35 U.S.C. §119 to Japanese Patent Application No. 2006-326271 filed on Dec. 1, 2006, the entire disclosure of which is incorporated herein by reference in its entirety.

BACKGROUND OF THE INVENTION

1. Field of the Invention

The present invention relates to a printing system in which a personal computer (hereinafter will be referred to as "PC") is connected via a network to a plurality of printing apparatuses such as MFPs (Multi Function Peripherals) that are digital multifunctional complex machines, and a preferable one among the plurality of printing apparatuses is easily set as the default printing apparatus by a user using the PC, a printing apparatus, a terminal apparatus, a print setting method, and a print setting program that are preferably used in the printing system.

2. Description of the Related Art

The following description sets forth the inventor's knowledge of related art and problems therein and should not be construed as an admission of knowledge in the prior art.

With the advance of network technology, there have been more offices, etc. where a plurality of printing apparatuses are installed on a constructed network and those are selectively used depending on user's intention. In such a circumstance, a personal computer that is a user's using terminal apparatus usually carries installed printer drivers for the respective plurality of printing apparatuses on the network so that he/she could use those. And the respective plurality of printing apparatuses on the network are displayed on a display of the user's using PC when he/she intends to use a printing apparatus, and he/she selects a preferable one among the displayed printing apparatuses. Further, if the user sets in advance a preferable printing apparatus as the default printing apparatus, in other words, his/her usual printing apparatus, then he/she will perform printing by the preferable printing apparatus without the bother of making a selection every time.

However, if the user would like to use a particular printing apparatus because it is located in the most vicinity of his/her place for example, he/she hardly recognizes the particular one among the plurality of printing apparatuses displayed on a display of his/her using PC, in many cases. Further, it is all the worse in the case where there exist a plurality of printing apparatuses of a model that is the same as the particular printing apparatus. In this case, the user needs to inquire a MFP administrator for information about the particular printing apparatus.

According to Japanese Patent Publication No. 3184687, once a user's using PC is connected to a network, printer drivers for the printers on the network are automatically installed on the PC, then the user performs printing using the installed printer drivers.

In the art disclosed in the publication right above, printer drivers for the plurality of printing apparatuses on the network are automatically installed on the PC. However, a user has to set manually a preferable printing apparatus as the default printing apparatus by selecting among the plurality of printing apparatuses via a screen displayed on the PC. And, the user still needs to inquire a network administrator or a MFP administrator for information about his/her preferable printing apparatus. That means that the art disclosed in the publication above does not give a fundamental solution against this issue, neither.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide a printing system that allows a user to set easily a preferable printing apparatus as the default printing apparatus without the bother of inquiring for information about the preferable printing apparatus, in the circumstances not only where one single printing apparatus is connected to a network but also where a plurality of printing apparatuses are connected thereto.

It is another object of the present invention to provide a printing apparatus preferably used in the printing system.

It is yet another object of the present invention to provide a terminal apparatus preferably used in the printing system.

It is still yet another object of the present invention to provide a print setting method that allows a user to set easily a preferable printing apparatus as the default printing apparatus without the bother of inquiring for information about the preferable printing apparatus, in the circumstances not only where one single printing apparatus is connected to a network but also where a plurality of printing apparatuses are connected thereto.

It is still yet another object of the present invention to provide a print setting program that makes a computer of the printing apparatus execute print setting processing.

According to a first aspect of the present invention, a printing system comprises a terminal apparatus and a printing apparatus interconnected via a network, and said printing apparatus comprises:

an identifier that identifies a user making access;

an information acquirer that acquires information of a terminal apparatus used by the user who is identified by said identifier; and a transmitter that transmits printing apparatus information that is information of the printing apparatus itself, to the user's using terminal apparatus that is indicated in the information acquired by said information acquirer, and said terminal apparatus comprises:

a receiver that receives the printing apparatus information transmitted from said printing apparatus;

a setter that sets said printing apparatus as the default printing apparatus according to the printing apparatus information received by said receiver.

According to a second aspect of the present invention, a printing apparatus capable of being connected to a terminal apparatus via a network comprises:

an identifier that identifies a user making access;

an information acquirer that acquires information of a terminal apparatus used by the user who is identified by said identifier; and a transmitter that transmit printing apparatus information that is information of the printing apparatus itself, to the user's using terminal apparatus that is indicated in the information acquired by said information acquirer.

According to a third aspect of the present invention, a terminal apparatus comprises:
- a receiver that receives printing apparatus information of a printing apparatus having authenticated a user making access, from the printing apparatus via a network;
- a setter that sets said printing apparatus as the default printing apparatus according to the printing apparatus information received by said receiver.

According to a fourth aspect of the present invention, a print setting method comprises the following steps executed by a printing apparatus:
- an identification step to identify a user making access;
- an information acquisition step to acquire information of a terminal apparatus used by the user who is identified in said identification step; and
- a transmission step to transmit via a network, printing apparatus information that is information of the printing apparatus itself, to the user's using terminal apparatus that is indicated in the information acquired in said information acquisition step, and the following steps executed by a terminal apparatus:
- a reception step to receive the printing apparatus information transmitted by said printing apparatus; and
- a setting step to set said printing apparatus as the default printing apparatus according to the printing apparatus information received in said reception step.

According to a fifth aspect of the present invention, a print setting program stored in a computer readable recording medium to make a computer of a printing apparatus execute:
- an identification step to identify a user making access;
- an information acquisition step to acquire information of a terminal apparatus used by the user who is identified in said identification step; and
- a transmission step to transmit via a network, printing apparatus information that is information of the printing apparatus, to the user's using terminal apparatus that is indicated in the information acquired in said information acquisition step.

According to a sixth aspect of the present invention, a print setting program stored in a computer readable recording medium to make a computer of a printing apparatus execute:
- a reception step to receive via a network, printing apparatus information that is information of a printing apparatus that identified a user making access, from said printing apparatus; and
- a setting step to set said printing apparatus as the default printing apparatus according to the printing apparatus information received in said reception step.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

<Embodiment #1>

Figure 1:
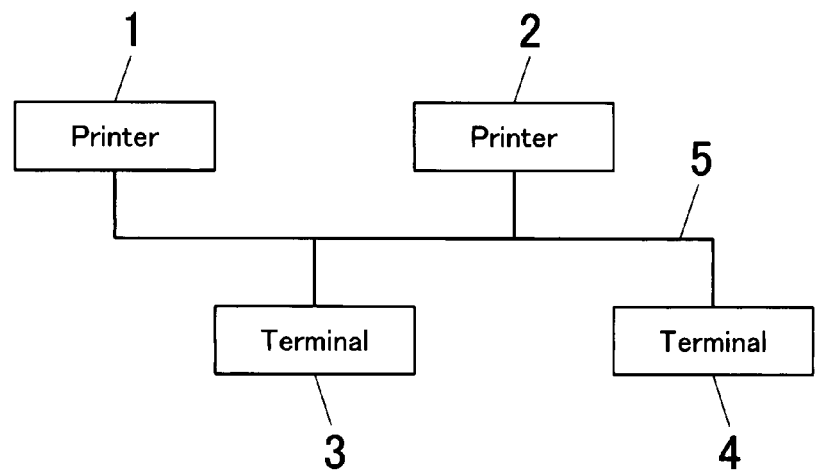
FIG. 1 is a block diagram showing a configuration of a printing system according to a first embodiment of the present invention.

FIG. 1 is a diagram showing an overall configuration of a network printing system according to a first embodiment of the present invention.

Hereinafter, "printing apparatus" will be also referred to as "printer", and "printing apparatus information" will be also referred to as "printer information".

As shown in this printing system, printers 1 and 2, and terminal apparatuses 3 and 4 are personal computers and interconnected via a network 5. In this embodiment, an image forming apparatus comprising a MFP that is a multifunctional complex machine, is employed as the printers 1 and 2.

Hereinafter, explanation about a configuration of the printer 1 will be provided. Since a configuration of the printer 2 is the same as that of the printer 1, explanation about a configuration of the printer 2 will be omitted.

Figure 2:
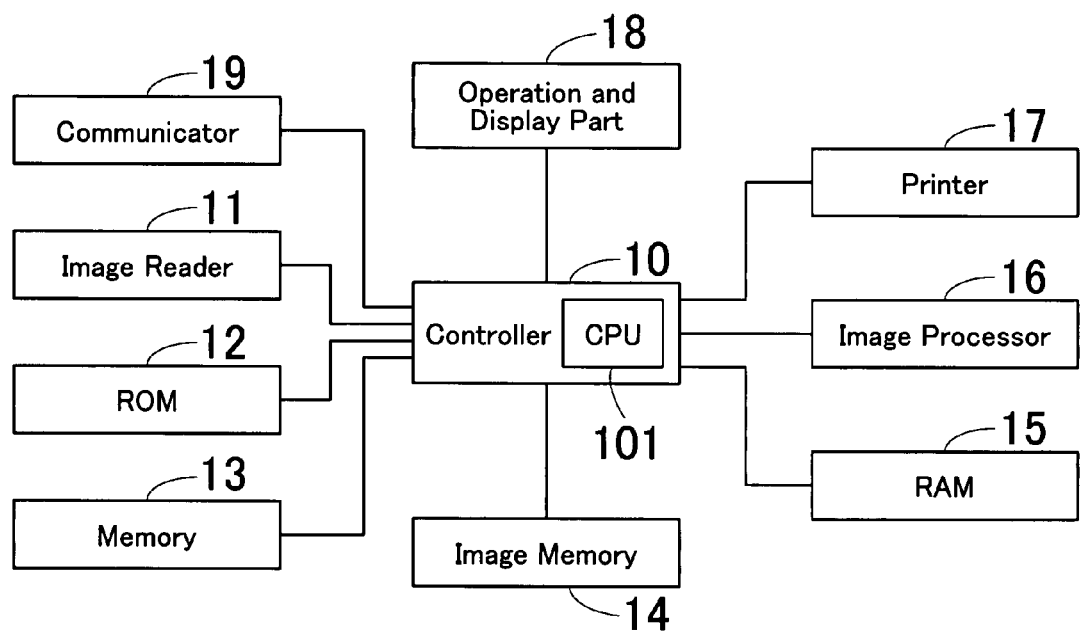
FIG. 2 is a block diagram showing a configuration of a printing apparatus that is used in the system shown in FIG. 1.

FIG. 2 is a block diagram showing a configuration of the printer 1 shown in FIG. 1.

The printer 1 comprises a controller 10, an image reader 11, a ROM 12, a memory 13, an image memory 14, a RAM 15, an image processor 16, a printer 17, an operation and display part 18 and a communicator 19, and all the parts right above excluding the controller 10 are connected to the controller 10.

The controller 10 comprises a CPU 101, etc., and controls the overall printer 1. Detailed explanation about the controller 10 will be provided later.

The image reader 11 comprises a scanner for example, and reads an image on a document set by a user then converts it to image data that is electronic data.

The ROM 12 records therein a program executed by the CPU 101 of the controller 10, and other data.

The memory 13 is a recording medium such as a hard disk (HDD), and stores various data therein. For example in this embodiment, the memory 13 stores therein user information (login information) including user IDs and passwords to authenticate and identify users making access to the printer 1 (access user), and information of users' using terminal apparatuses 3 and 4 (hereinafter, will be referred to as terminal apparatus information or simply as terminal information). The terminal apparatus information stored therein is related to the user information.

The image memory 14 temporarily stores therein the image data read out from a document by the image reader 11.

The RAM 15 is a temporal recording medium, and temporarily stores therein a program executed by the CPU 101 of the controller 10, data needed when the program is executed, etc.

The image processor 16 performs well known image processes such as gamma correction, etc., on the image data outputted from the image reader 11 then temporarily stored in the image memory 14.

The printer 17 prints the image data on a sheet according to instructions given by the controller 10.

The operation and display part 18 displays various messages and screens for user entry and selection and is used by the user for various operations. It comprises a keyboard such as a numeric key pad, and a touch-panel liquid crystal display.

The communicator 19 exchanges data with external apparatuses such as the terminal apparatuses 3 and 4, and the printer 2.

Hereinafter, explanation about a configuration of the terminal apparatus 3 will be provided in this embodiment. Since a configuration of the terminal apparatus 4 is the same as that of the terminal apparatus 3, explanation about a configuration of the terminal apparatus 4 will be omitted.

As previously mentioned, the terminal apparatus 3 is a personal computer, wherein a ROM 22, a RAM 23, a display 24, a memory 25, a keyboard 26, a mouse 27, a communication interface (communication I/F) 28 and a CD-ROM drive 29 are connected to a bus line 30 that is extended from a CPU 21.

The CPU 21 controls the overall terminal apparatus 3. Detailed explanation about the CPU 21 will be provided later.

The ROM 22 records therein a program for the CPU 21 and other data.

The RAM 23 provides an operation area for the CPU 21 to perform operation according to the program.

The display 24 is a CRT, and displays various messages, screens for user entry or selecting operation, and the user's created documents, etc.

The memory 25 is a recording medium such as a hard disk (will be also referred to as "HDD"), and it records therein data files such as document or image data created by user operations using the keyboard 26 and the mouse 27, application software, printer drivers for the plurality of printers 1 and 2 on the network 5, and other data.

The keyboard 26 and the mouse 27 are used by a user for entry operations.

The communication interface 28 functions as a communicator that exchanges data with the printer 1, etc., shown in FIG. 1, via the network 5.

The CD-ROM drive 29 drives a CD-ROM.

Operations Performed by Printer

Figure 4:
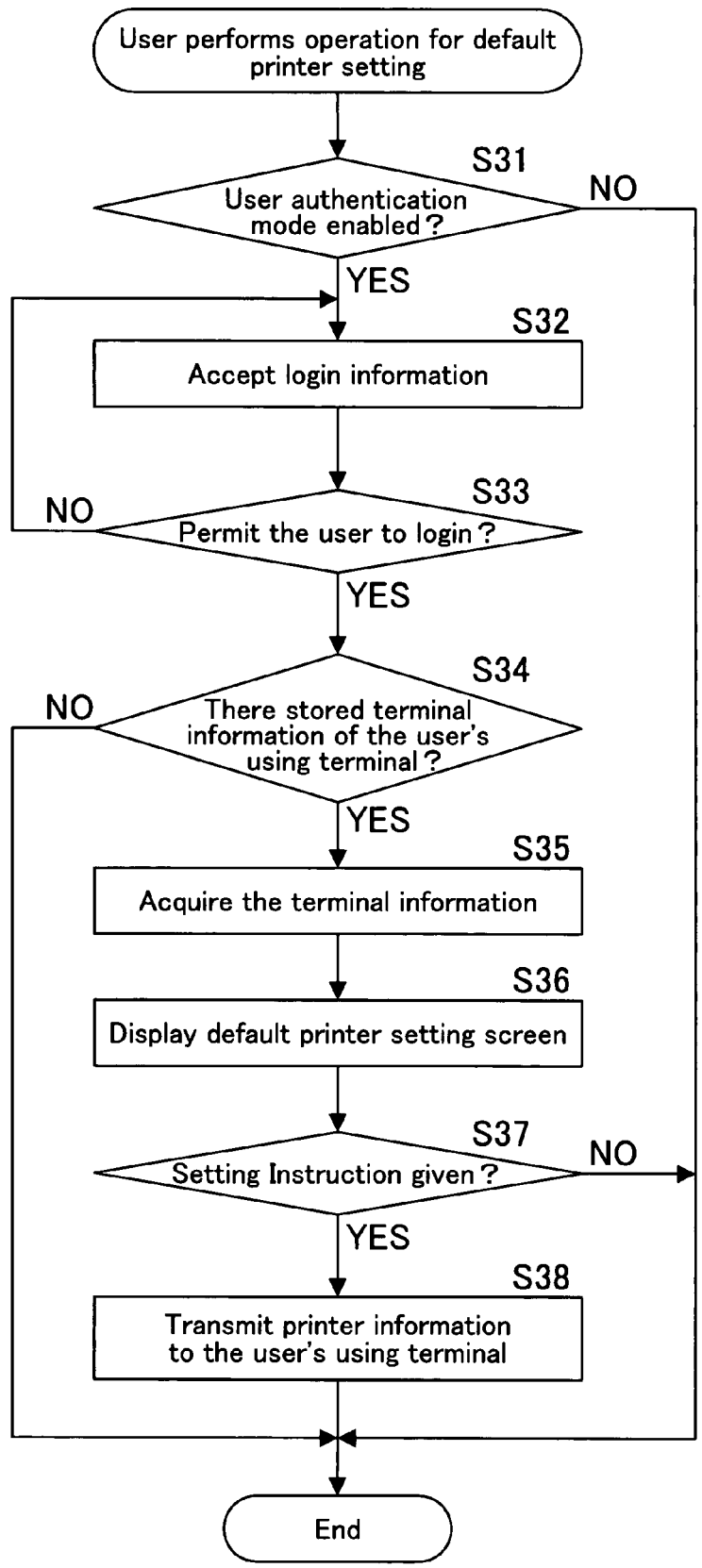
FIG. 4 is a flowchart showing operations performed by the printing apparatus shown in FIG. 2.

In this embodiment, printer drivers for the plurality of printers 1 and 2 on the network 5 are preliminarily installed on the terminal apparatus 3. When a user using the terminal apparatus 3 would like to set the printer 1 for example, among the printers 1 and 2 as the default printer to be regularly used, he/she is required to perform setting operation from the printer 1. Operations performed by the printer 1 will be explained with reference to a flowchart shown in FIG. 4.

Concretely, these operations are executed by the CPU 101 of the controller 10 in the printer 1, according to a program stored in a recording medium such as the ROM 12.

First, under the control of the CPU 101 of the controller 10, it is judged whether or not the user authentication mode is enabled on the printer 1 (Step S31). If the user authentication mode is not enabled (NO in Step S31), the routine terminates. If the user authentication mode is enabled (YES in Step S31), user authentication is performed. In other words, entered login information for user identification is accepted (Step S32), then it is judged based on the accepted login information whether or not to permit the user to login (Step S33).

If the user is not permitted to login (NO in Step S33), the routine returns to Step S32 and waits until login information is entered again by the user. If the user is permitted to login (YES in Step S33), the routine proceeds to Step S34.

In Step S34, under the control of the CPU 101, it is judged based on the accepted login information whether or not terminal information of the terminal apparatus 3 related to the user, in other words, terminal information including an IP address of the user's using terminal apparatus, is stored in the memory 13.

Figure 5:
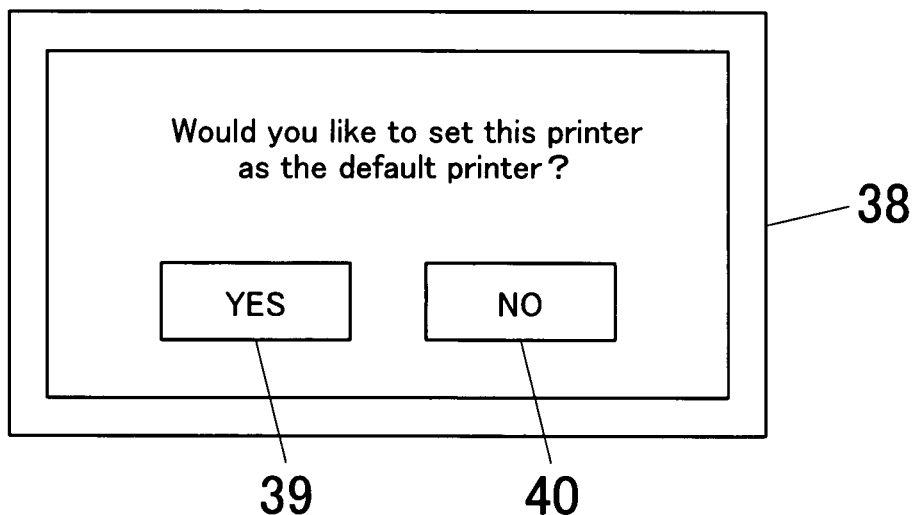
FIG. 5 is a view showing a default printer setting screen that accepts user instruction to set a printer as the default printer.

If it is judged the terminal information is not stored in the memory 13 (NO in Step S34), the routine terminates. If it is judged the terminal information is stored in the memory 13 (YES in Step S34), the terminal information is acquired and the terminal apparatus is identified (Step S35), then a default printer setting screen 38 shown in FIG. 5 is displayed on the operation and display part 18 (Step S36), and then the routine waits until an instruction to set the printer 1 as the default printer is given by the user (Step S37). The default printer means the printer to be regularly used and preferentially displayed as the first candidate in a printer selection field when a user gives an instruction to print a document using application software activated on his/her terminal apparatus.

If a "YES" button 39 is pressed (YES in Step S37), under the control of the CPU 101, printer information including an IP address of the printer 1 is transmitted to the terminal apparatus 3 via the transmitter 19 in Step S38, then the routine terminates. If a "NO" button 40 is pressed (YES in Step S37), the routine directly terminates.

As described above, printer information of the printer 1 that is a user's preferable printer is transmitted to his/her using terminal apparatus 3 from the printer 1. On the other hand, the terminal apparatus 3 that receives the printer information from the printer 1 performs operations to be described below.

Operations Performed by Terminal Apparatus When Receiving Printer Information

Figures 6, 7:
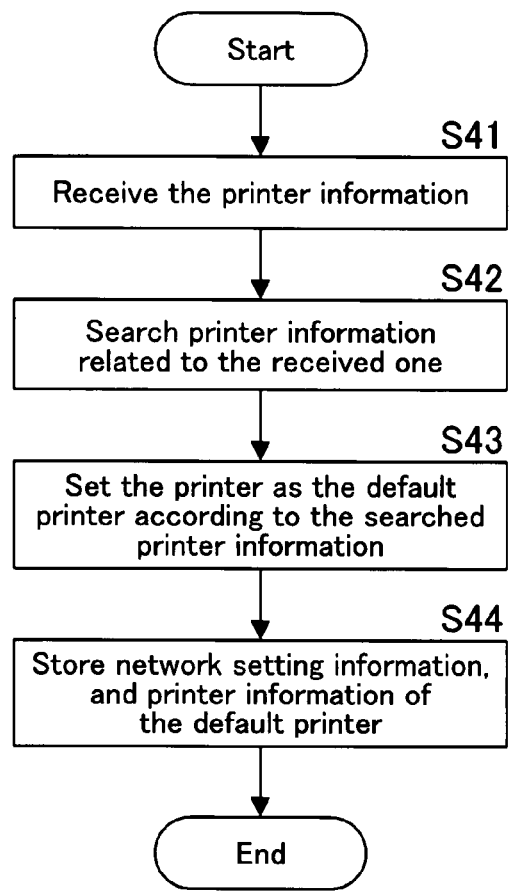
FIG. 6 is a flowchart showing operations performed by the terminal apparatus when it receives printing apparatus information from the printing apparatus.
FIG. 7 is a view showing network setting information and printer information stored in a memory by the terminal apparatus.

FIG. 6 is a flowchart showing operations performed by the terminal apparatus 3 when it receives the printer information from the printer 1.

These operations are executed by the CPU 21 in the terminal apparatus 3 according to a program stored in a recording medium such as the ROM 22.

Under the control of the CPU 21, the printer information including an IP address of the printer 1 is received via the communication interface 28 (Step S41), then printer information including a printer driver, which relates to the received printer information, is searched in the memory 25 (Step S42).

Under the control of the CPU 21, according to the searched printer information, the printer 1 that transmitted the printer information is set as the default printer to be regularly used (Step S43). Then, network setting information 46 including an IP address, a subnet mask and check for a DHCP (Dynamic Host Configuration Protocol) of the terminal apparatus, and printer information 47 (shown in FIG. 7) including a name and an IP address of the default printer, are stored in the memory 25 (Step S44), and then the routine terminates.

In this way as described above, once a user performs entry operation for user authentication from his/her preferable printer, printer information is automatically transmitted to the user's using terminal apparatus from the printer if the user authentication succeeds, and then the printer is automatically set as the default printer on the terminal apparatus 3 based on the printer information. That relieved him/her of the bother of inquiring an administrator, etc. for information about his/her preferable printer in order to select it among a plurality of printers displayed on the terminal apparatus, and of performing from the terminal apparatus an operation to set his/her preferable printer as the default printer.

Operations Performed by Terminal Apparatus When Disconnected from Network

Figure 8:
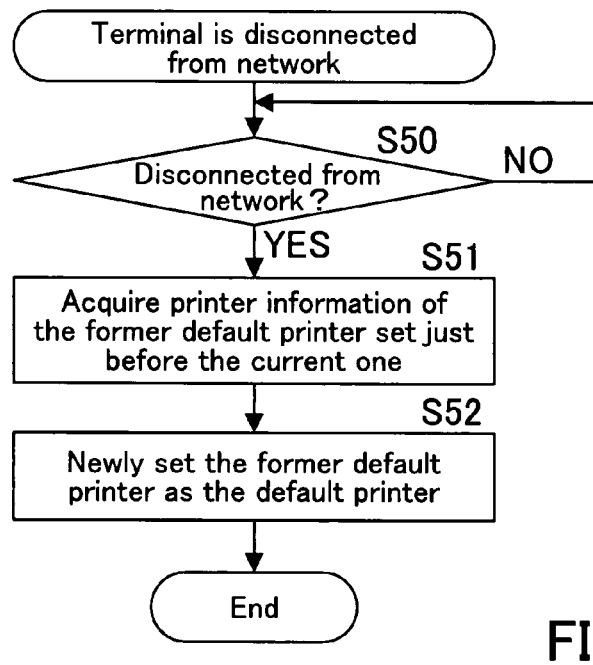
FIG. 8 is a flowchart showing operations performed by the terminal apparatus when it is disconnected from a network.

Hereinafter, operations performed by the terminal apparatus 3 when it is disconnected from the network 5, will be explained with reference to a flowchart shown in FIG. 8.

These operations are also executed by the CPU 21 in the terminal apparatus 3 according to a program stored in a recording medium such as the ROM 22.

Under the control of the CPU 21, it is judged whether or not the terminal apparatus is disconnected from the network (Step S50). If it is disconnected from the network (YES in Step S50), printer information of the former default printer set just before the current default printer is acquired from the memory 25 (Step S51), then the former default printer is newly set as the default printer on the terminal apparatus (Step S52), and then the routine terminates.

It is convenient that a regular printer is automatically returned as the default printer after a different printer is temporarily used as the default printer.

Setting Default Printer Depending on Condition Information of Terminal Apparatus Hereinafter, a procedure will be explained with reference to a flowchart shown in FIG. 9, wherein a printer is newly set as the default printer on the terminal apparatus 3 if a condition recorded in the terminal apparatus 3 is reproduced, in which the terminal apparatus 3 was when the printer was set as the default printer on the terminal apparatus 3.

These operations are also executed by the CPU 21 in the terminal apparatus 3 according to a program stored in a recording medium such as the ROM 22.

A condition where the terminal apparatus 3 was when a printer was set as the default printer on the terminal apparatus 3 is preliminarily recorded in the memory 25 as condition information of the terminal apparatus 3, and the recorded condition information is related to the default printer. In this way, every time a new printer is set as the default printer, condition information of the new printer is recorded in the memory 25. FIG. 9 shows an example of operations performed if the condition information is network setting information of the terminal apparatus 3. The network setting information includes an IP address, a subnet mask and check for a DHCP, and is related to each printer name of a printer having been set as the default printer, as shown in FIG. 10.

Under the control of the CPU 21, it is judged whether or not the terminal apparatus 3 is connected to the network (Step S60). If it is connected to the network (YES in Step S60), network setting information that corresponds to the one of the terminal apparatus 3 connected to the network 5, is searched in the history of condition information (network setting information) recorded in the memory 25 (shown in FIG. 10). Subsequently, it is judged whether or not there exists in the history, the network setting information that corresponds to the one of the terminal apparatus 3 connected to the network 5 (Step S62).

If there exists the corresponding network setting information (YES in Step S62), a printer related to the searched network setting information is newly set as the default printer (Step S63), then the routine terminates. If there does not exist the corresponding network setting information (NO in Step S62), terminal information including an IP address of the terminal apparatus 3 is transmitted via the communication interface 28 to the printers currently connected to the network (Step S64), then the routine terminates.

Figures 10, 11:
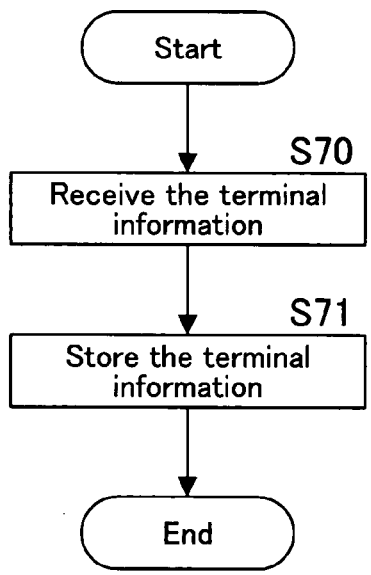
FIG. 10 is a table showing history of network setting information that is information of conditions where the terminal apparatus was.
FIG. 11 is a flowchart showing operations performed by the printing apparatus when it receives terminal apparatus information from the terminal apparatus.

As shown in FIG. 10, there is a section to check for a DHCP in the network setting information. If it is "YES" for DHCP, an IP address assigned for the terminal apparatus within the subnetwork is indeterminate. For example, if connection is established under the condition where it is IP: 192.168.1.55 for the terminal apparatus, 255.255.255.0 for the subnet mask and "YES" for DHCP, a printer with 192.168.1.* ("*" is not specified) is regarded to be within the subnetwork. From the searching result, it is judged the printer is connected to the same network as the terminal apparatus 3 with 192.168.1.32, then the printer is set as the default printer. On the other hand, if it is "NO" for DHCP, all IP addresses are determinate. Thus, network setting information having the IP addresses perfectly corresponding to those of the network is searched. For example, if connection is established under the condition where it is IP: 192.168.0.33 for the terminal apparatus and "NO" for DHCP, it is judged there does not exist the corresponding network setting information in the history, then the condition is recognized as new.

However, even if it is "NO" for DHCP, a regular printer within the subnetwork is limited depending on a network configuration. Thus, an option "set as the default printer, a printer once used within the same subnetwork no matter if it is "NO" for DHCP" can be selected.

Figure 9:
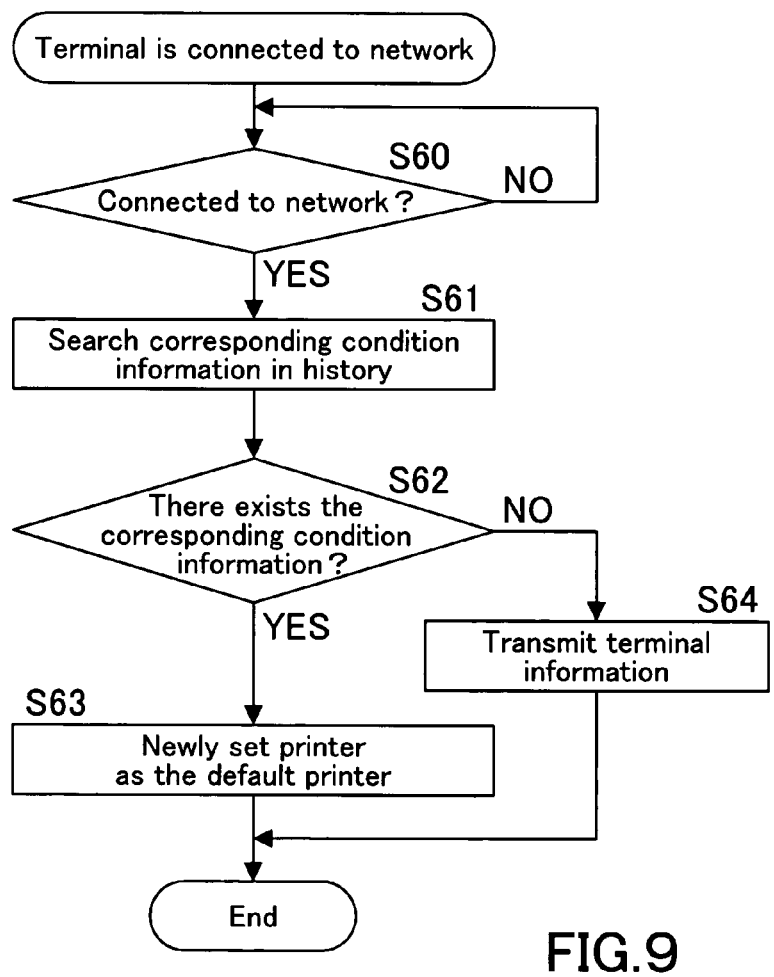
FIG. 9 is a flowchart showing operations performed by the terminal apparatus when it sets the default printer according to condition information.

Further, although FIG. 9 shows an example of operations performed if the condition information is network setting information, it is not limited to network setting information. For example, the condition information can be a location or a position of the terminal apparatus 3, in which a printer is once set as the default printer on the terminal apparatus 3, and this condition information is identified by a GPS or other. In this case, it can be configured such that this condition information is related to the printer once set as the default printer and is recorded therein, then this related printer is set again as the default printer on the terminal apparatus 3 if the terminal apparatus 3 is connected to the network at the location or the position.

In this way as described above, a printer is automatically set as the default printer according to the history of condition information, without any operation from the printer. Specifically, it is convenient that a printer once set as the default printer at a frequent destination such as a business trip destination, is automatically set as the default printer again.

FIG. 11 is a flowchart showing operations performed by the printer 1 for example, when it receives the terminal information transmitted in Step S64 in FIG. 9.

These operations are also executed by the CPU 101 of the controller 10 according to a program stored in a recording medium such as the ROM 12.

Under the control of the CPU 101 of the controller 10, the terminal information is received from the terminal apparatus 3 via the communicator 19 (Step S70), then it is stored in the memory 13 (Step S71), and the routine terminates.

In this way, new terminal information are accumulated in the printer 1.

<Embodiment #2>

Hereinafter, a second embodiment of the present invention will be explained.

Figure 3:
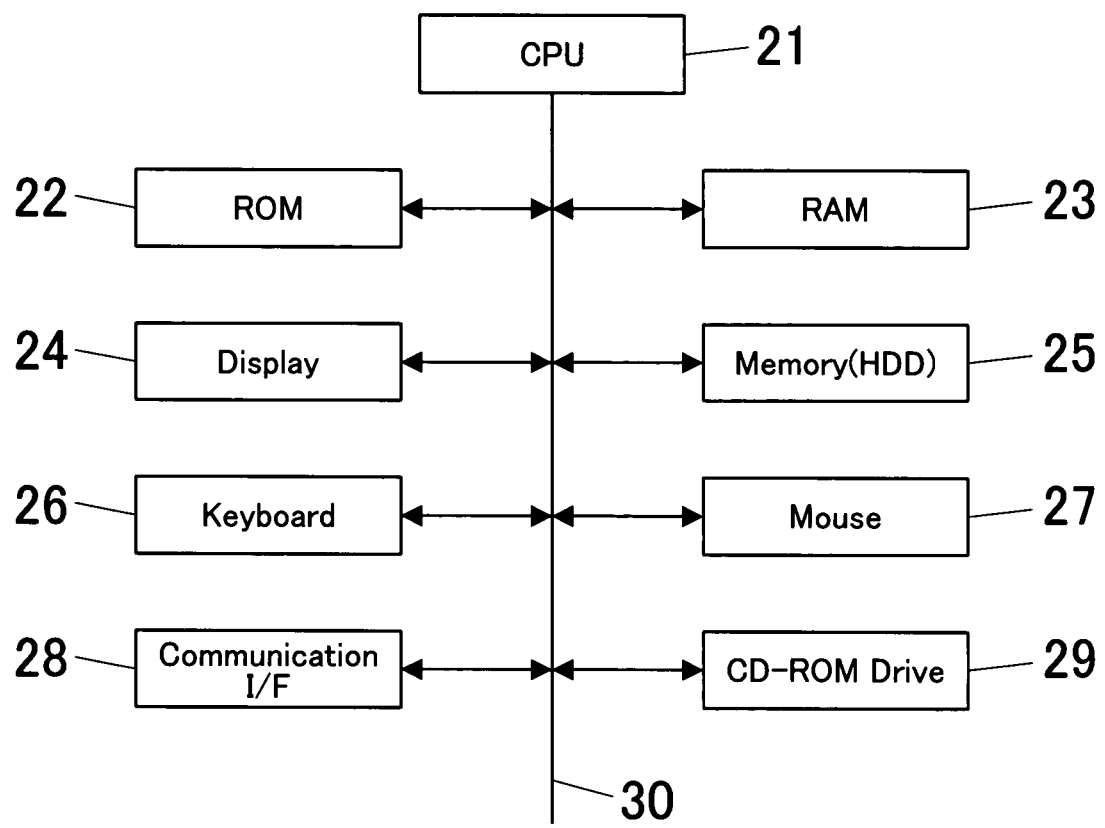
FIG. 3 is a block diagram showing a configuration of a terminal apparatus that is used in the system shown in FIG. 1.

Since configurations of a system, printers 1 and 2, terminal apparatuses 3 and 4 according to the second embodiment of the present invention, are the same as those shown in FIG. 1 through FIG. 3, explanation about the configurations will be omitted in this embodiment.

In the first embodiment of the present invention, terminal information of the terminal apparatus 3 or 4 is individually stored in the printer 1 or 2. On the other hand, in the second embodiment of the present invention, it is centrally stored as information shared among the overall system, in either of the plurality of printers 1 or 2, a server apparatus that is other than the printers, or etc. With this configuration, if terminal information of a user's using terminal apparatus is not stored in a printer that performs user authentication when he/she sets the printer as the default printer, the terminal information is acquired via the network 5 from an external storage destination such as other printer.

Operations Performed by Printer

Figure 12:
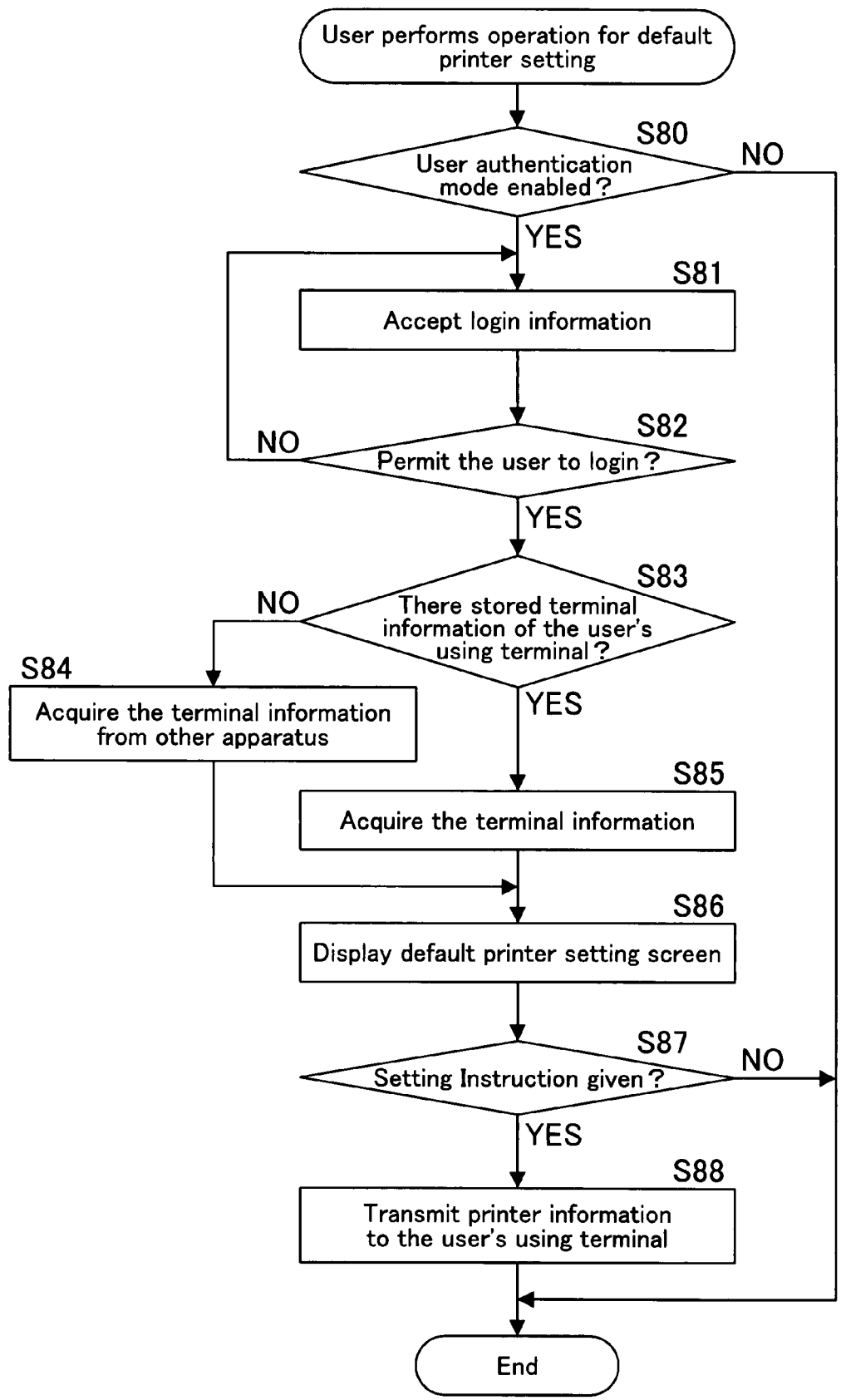
FIG. 12 is a flowchart showing operations performed by the printing apparatus according to a second embodiment of the present invention.

Hereinafter, operations performed by the printer 1 when a user sets the printer 1 as the default printer, will be explained with reference to a flowchart shown in FIG. 12.

These operations are also executed by the CPU 101 of the controller 10 according to a program stored in a recording medium such as the ROM 12.

First, under the control of the CPU 101 of the controller 10, it is judged whether or not the user authentication mode is enabled on the printer 1 (Step S80). If the user authentication mode is not enabled (NO in Step S80), the routine terminates. If the user authentication mode is enabled (YES in Step S80), user authentication is performed. In other words, entered login information for user identification is accepted (Step S81), then it is judged based on the accepted login information whether or not to permit the user to login (Step S82).

If the user is not permitted to login (NO in Step S82), the routine returns to Step S81 and waits until login information is entered again by the user. If the user is permitted to login (YES in Step S82), the routine proceeds to Step S83.

In Step S83, under the control of the CPU 101, it is judged based on the accepted login information whether or not terminal information of the terminal apparatus 3 related to the user, in other words, terminal information including an IP address of the user's using terminal apparatus, is stored in the memory 13.

If it is judged the terminal information is not stored in the memory 13 (NO in Step S83), under the control of the CPU 101, the terminal information is acquired via the communicator 19 from an external apparatus such as the printer 2 and the terminal apparatus is identified (Step S84), then the routine proceeds to Step S86. If it is judged the terminal information is stored in the memory 13 (YES in Step S83), the terminal information is acquired from the memory 13 and the terminal apparatus is identified (Step S85), then the routine proceeds to Step S86.

In Step S86, the default printer setting screen 38 shown in FIG. 5 is displayed on the operation and display part 18, and the routine waits until an instruction to set the printer 1 as the default printer is given by the user (Step S87).

If the "YES" button 39 is pressed (YES in Step S87), printer information including an IP address of the printer 1 is transmitted via the communicator 19 to the terminal apparatus 3 (Step S88), then the routine terminates. If the "NO" button 40 is pressed (NO in Step S87), the routine directly terminates.

In this embodiment as described above, terminal information of the terminal apparatuses 3 and 4 are stored at least in one of the plurality of printers on the network or in an apparatus other than the printers, which is connected to the network, and it is not needed to be stored in the respective printers on the network.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A printing system comprising a terminal apparatus and a printing apparatus interconnected via a network, wherein:
said printing apparatus comprises:
an identifier that identifies a user making access;
an information acquirer that acquires information of a terminal apparatus used by the user who is identified by said identifier;
an inputter that inputs an instruction to set the printing apparatus as default by the user; and
a transmitter that transmits printing apparatus information that is information of the printing apparatus itself, to the terminal apparatus used by the user that is indicated in the information acquired by said information acquirer when the instruction is input by the inputter, and said terminal apparatus comprises:

a receiver that receives the printing apparatus information transmitted from said printing apparatus;

a setter that sets said printing apparatus as default according to the printing apparatus information received by said receiver;

a memory that records therein printing apparatus information of printing apparatuses having been set as default by said setter, which are related to condition information indicating conditions in which the terminal apparatus itself was when the printing apparatuses were set as default, said condition information including network setting information and DHCP setting of the terminal apparatus; and a judger that judges whether or not the terminal apparatus itself is in one of the conditions indicated by said condition information by a different method depending on the DHCP setting of the terminal apparatus, wherein said setter sets said printing apparatus as default according to the printing apparatus information related to the condition information, if said judger judges the terminal apparatus itself is in one of the conditions indicated by said condition information.

2. The printing system as recited in claim 1, wherein said printing apparatus further comprises an embedded storage that stores therein information of terminal apparatuses, which are related to respective users, and the information acquirer in said printing apparatus acquires information of said terminal apparatus from said embedded storage.

3. The printing system as recited in claim 1, wherein the information acquirer in said printing apparatus acquires information of said terminal apparatus from an external apparatus carrying stored information of terminal apparatuses, which are related to respective users.

4. The printing system as recited in claim 1, wherein said terminal apparatus further comprises a detector that detects the terminal apparatus itself is disconnected from said network, and said setter newly sets as default, a printing apparatus that was set as default printing apparatus just before the printing apparatus currently set as default, if said detector detects the terminal apparatus itself is disconnected from the network.

5. A print setting method comprising the following steps executed by a printing apparatus:

an identification step to identify a user making access;

an information acquisition step to acquire information of a terminal apparatus used by the user who is identified in said identification step;

an inputting step to input an instruction to set the printing apparatus as default by the user; and a transmission step to transmit via a network, printing apparatus information that is information of the printing apparatus itself, to the terminal apparatus used by the user that is indicated in the information acquired in said information acquisition step when the instruction is input in the inputting step, and the following steps executed by a terminal apparatus:

a reception step to receive the printing apparatus information transmitted by said printing apparatus;

a first setting step to set said printing apparatus as default according to the printing apparatus information received in said reception step;

a recording step to record printing apparatus information of printing apparatuses having been set as default by said first setting step, which are related to condition information indicating conditions in which the terminal apparatus itself was when the printing apparatuses were set as default, said condition information including network setting information and DHCP setting of the terminal apparatus;

a judgment step to judge whether or not the terminal apparatus itself is in one or more of the conditions indicated by said condition information by a different method depending on the DHCP setting of the terminal apparatus; and a second setting step to set a printing apparatus as default according to the printing apparatus information related to the condition information, if it is judged the terminal apparatus itself is in one or more of the conditions indicated by said condition information.

6. The print setting method as recited in claim 5, wherein information of said terminal apparatus is acquired from a storage embedded in the printing apparatus, in said information acquisition step.

7. The print setting method as recited in claim 5, wherein information of said terminal apparatus is acquired from an external apparatus carrying stored information of terminal apparatuses, which are related to respective users.

8. The print setting method as recited in claim 5, wherein said terminal apparatus further executes a detection step to detect the terminal apparatus itself is disconnected from said network, and sets as default a printing apparatus that was set as default just before the printing apparatus currently set as default, if it is detected in said detection step that the terminal apparatus itself is disconnected from said network.

9. A print setting program stored in a non-transitory computer readable recording medium to make a computer of a printing apparatus execute:

an identification step to identify a user making access;

an information acquisition step to acquire information of a terminal apparatus used by the user who is identified in said identification step;

an inputting step to input an instruction to set the printing apparatus as default by the user; and a transmission step to transmit via a network, printing apparatus information that is information of the printing apparatus itself, to the terminal apparatus used by the user that is indicated in the information acquired in said information acquisition step when the instruction is input in the inputting step, and to make a computer of a terminal apparatus execute:

a reception step to receive via a network, printing apparatus information that is information of a printing apparatus that identified a user making access, from said printing apparatus;

a first setting step to set said printing apparatus as default according to the printing apparatus information received in said reception step;

a recording step to record printing apparatus information of printing apparatuses having been set as default in said first setting step, which are related to condition information indicating conditions in which the terminal apparatus itself was when the printing apparatuses were set as default, said condition information including network setting information and DHCP setting of the terminal apparatus;

a judgment step to judge whether or not the terminal apparatus itself is in one or more of the conditions indicated by said condition information by a different method depending on the DHCP setting of the terminal apparatus; and a second setting step to set a printing apparatus as default according to the printing apparatus information related to the condition information, if it is judged the terminal apparatus itself is in one or more of the conditions indicated by said condition information.

10. The print setting program as recited in claim 9, wherein, in said information acquisition step, said information of said terminal apparatus is acquired from embedded storage of said printing apparatus that stores therein information of terminal apparatuses which are related to respective users.

11. The print setting program as recited in claim 9, further making the computer of the printing apparatus acquire in said information acquisition step, information of said terminal apparatus from an external apparatus carrying stored information of terminal apparatuses, which are related to respective users.

12. The print setting program as recited in claim 9, further making the computer of the terminal apparatus execute a detection step to detect the terminal apparatus is disconnected from said network, and makes the computer set as default a printing apparatus that was set as default just before the printing apparatus currently set as default, if it is detected in said detection step that the terminal apparatus is disconnected from the network.

* * * * *